United States Patent
Hartmann et al.

(10) Patent No.: US 9,796,474 B2
(45) Date of Patent: Oct. 24, 2017

(54) READING LAMP FOR INSTALLATION IN A CABIN TRIM ELEMENT OF A VEHICLE

(71) Applicant: Diehl Aerospace GmbH, Ueberlingen (DE)

(72) Inventors: Matthias Hartmann, Feucht (DE); Thomas Weninger, Neunkirchen (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 243 days.

(21) Appl. No.: 14/526,657

(22) Filed: Oct. 29, 2014

(65) Prior Publication Data

US 2015/0117040 A1    Apr. 30, 2015

(30) Foreign Application Priority Data

Oct. 29, 2013   (DE) .................. 10 2013 018 219

(51) Int. Cl.
*B64D 47/02*     (2006.01)
*B64D 11/00*     (2006.01)

(52) U.S. Cl.
CPC ...... *B64D 11/00* (2013.01); *B64D 2011/0053* (2013.01)

(58) Field of Classification Search
CPC ............................................ B64D 2011/0053
USPC ........................................................ 362/470
See application file for complete search history.

(56) References Cited

U.S. PATENT DOCUMENTS 5,377,087 A * 12/1994 Yoon .................. F21V 21/30
362/148

FOREIGN PATENT DOCUMENTS

| CN | 201293216 Y | 8/2009 |
|---|---|---|
| DE | 3820894 A1 | 12/1989 |
| DE | 102010042287 A1 | 4/2012 |
| DE | 102012017189 A1 | 3/2014 |

OTHER PUBLICATIONS

Notification of the First Office Action and Search Report dated Dec. 28, 2016 issued in Application No. 201410533061.4 (in English and Chinese).

* cited by examiner

*Primary Examiner* — Sean Gramling
(74) *Attorney, Agent, or Firm* — Scully Scott Murphy and Presser

(57) ABSTRACT

The invention relates to a reading lamp for installation in a cabin trim element (4) of a vehicle, in particular of an aircraft, comprising
an installation frame (1) having a ring element (2),
a lamp housing (7) having a mating support surface (8), and
a clamping ring (9)
wherein the clamping ring (9) is connected to the installation frame (1) by means of tension spring elements (10), such that the lamp housing (7) is forced against the support surface (6) of the inner surface of the ring element (2) by means of the clamping ring (9) and may be moved with respect to the installation frame (1) in the manner of a ball and socket joint.

9 Claims, 3 Drawing Sheets

READING LAMP FOR INSTALLATION IN A CABIN TRIM ELEMENT OF A VEHICLE

BACKGROUND OF THE INVENTION

The invention relates to a reading lamp for installation in a cabin trim element of a vehicle, in particular of an aircraft.

DISCUSSION OF THE PRIOR ART

Reading lamps respectively installed in a cabin trim element above a passenger seat are generally known in the context of aircraft, in particular passenger aeroplanes. Such reading lamps respectively have an at least partially ball-shaped lamp housing which may be moved with respect to an installation frame in the manner of a ball and socket joint. Hitherto, in order to move the lamp housing with respect to the installation frame, a relatively large adjustment force had to be overcome. This required the use of a special tool.

SUMMARY OF THE INVENTION

The object of the invention is to overcome the disadvantages of the prior art. In particular, the object is to propose a reading lamp which is as simple and as cost-effective as possible to produce and in which the lamp housing can be adjusted with respect to the installation frame without the use of a special tool.

The invention proposes a reading lamp for installation in a cabin trim element of a vehicle, in particular of an aircraft, comprising an installation frame having a ring element, whence a flange extends on a visible side so as to bear against an edge section surrounding a hole in the cabin trim element, wherein securing elements are provided on the ring element so as to secure the installation frame on the cabin trim element, and wherein an inner surface of the ring element has a support surface against which a lamp housing, which is configured at least in sections in the shape of a ball, may bear in a form-fitting manner, a lamp housing having a mating support surface, which is configured so as to correspond to the support surface, and a first sliding surface, a clamping ring having a second sliding surface which corresponds to the first sliding surface, wherein the clamping ring is connected to the installation frame by means of tension spring elements, such that the lamp housing is forced against the support surface by means of the clamping ring and may be moved with respect to the installation frame in the manner of a ball and socket joint.

According to the invention, the lamp housing is forced against the installation frame by means of a clamping ring connected to the installation frame by tension spring elements. Component tolerances can be compensated for by means of the construction according to the invention. A predefined, constant adjustment force is still necessary in order to adjust the lamp housing with respect to the installation frame. The adjustment force can be adjusted by means of the configuration of the tension spring elements used in each case. As well as this, in the context of the construction according to the invention, the lamp housing is held against the installation frame by means of the tension spring elements. The tension spring elements thus perform both a retaining function and the function of providing a predefined adjustment force for adjusting the lamp housing relative to the installation frame.

According to one advantageous embodiment, the clamping ring is made of PTFE or of a material which has similar sliding properties. An inner diameter of the clamping ring is smaller than an outer diameter of the lamp housing in the ball-shaped section. Likewise, a further inner diameter of the annular support surface is smaller than the outer diameter of the lamp housing in the ball-shaped section.

The tension spring elements are advantageously retaining clips made from a spring steel. The length of the retaining clips is such that the clamping ring is forced against the second sliding surface provided on the lamp housing and thus the lamp housing, having the mating support surface provided thereon, is forced against the support surface on the installation frame. The lamp housing is held in a friction-locking manner in a predefined position relative to the installation frame by means of the tension spring elements. Adjusting the lamp housing involves pushing it away from the installation frame, counter to the spring force provided by the tension spring elements, such that the mating support surface lifts off from the support surface. It is then possible to change the position of the lamp housing relative to the installation frame. Once the counter force, applied counter to the spring force of the tension spring elements, is no longer in effect, the lamp housing is forced into the changed position, with the mating support surface against the support surface, and is held there in a friction-locking manner.

According to a further advantageous configuration, the securing elements comprise first latching springs, wherein a first end of the first latching springs has a first separation with respect to the flange. The securing elements may furthermore comprise second latching springs, wherein a second end of the second latching springs has a second separation with respect to the flange, and wherein the second separation is smaller than the first separation. The first separation substantially corresponds to a first thickness of a conventional cabin trim element. The second separation substantially corresponds to a second thickness of a further conventional cabin trim element. With the simultaneous use of securing elements having first and second latching springs, the installation frame can be quickly and simply secured to cabin trim elements of various thicknesses. To that end, the installation frame need only be inserted into the hole. Depending on the thickness of the cabin trim element, the installation frame is then held on the cabin trim element by either the first or the second latching springs, in that the respective latching springs engage behind a rear side opposite the visible surface of the cabin trim element. The proposed reading lamp can be quickly and simply mounted onto cabin trim elements of various thicknesses.

According to a further configuration, the first and the second latching springs are respectively attached adjacent to one another on the installation frame. The first and the second latching springs may be produced in one piece and form in each case one securing element. Four first and four second latching springs are expediently provided on the installation frame. A tension spring element is expediently provided in each case between latching spring groups formed by a first and an adjacent second latching spring.

According to a further advantageous configuration, the lamp housing is formed of a first housing shell, which comprises the first sliding surface, and a second housing shell, which comprises the first mating support surface. The first and the second housing shell are advantageously latched to one another. This permits simple production of the lamp housing.

BRIEF DESCRIPTION OF THE DRAWINGS

An exemplary embodiment of the invention will be described in more detail below with reference to the drawing, in which.

DETAILED DESCRIPTION OF THE INVENTION

Figure 1:
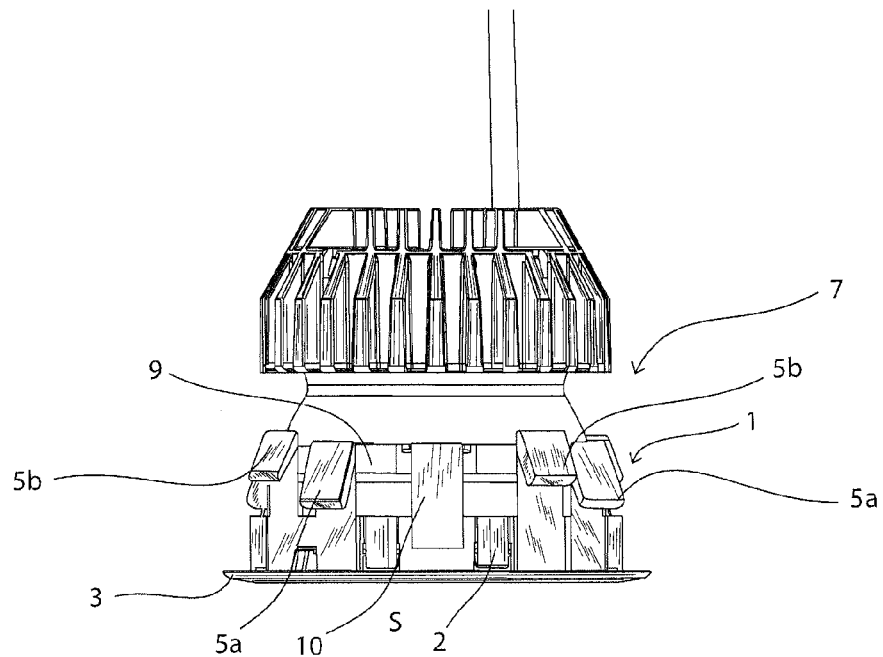
FIG. 1 is a side view of a reading lamp.
Figure 2:
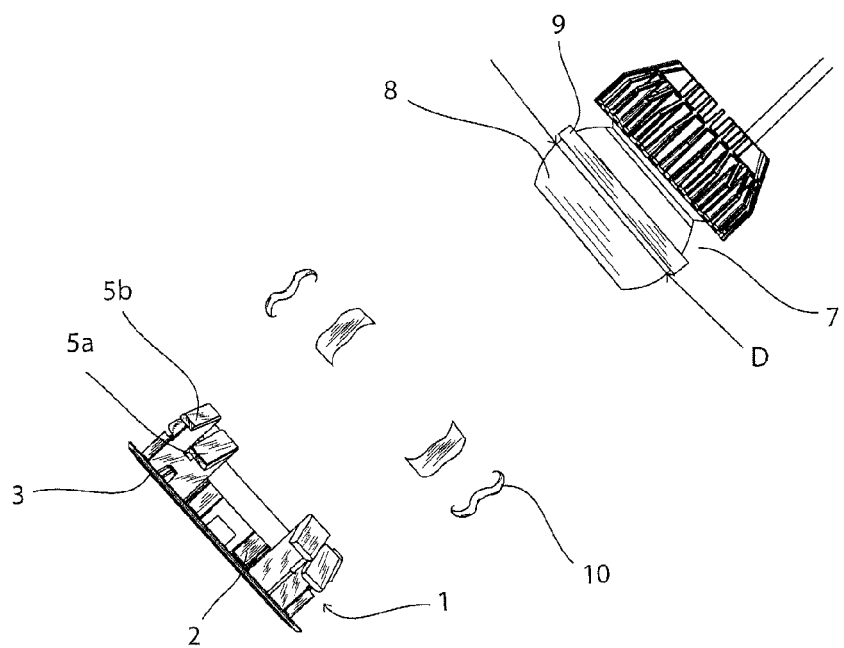
FIG. 2 is an exploded view according to FIG. 1.
Figure 3:
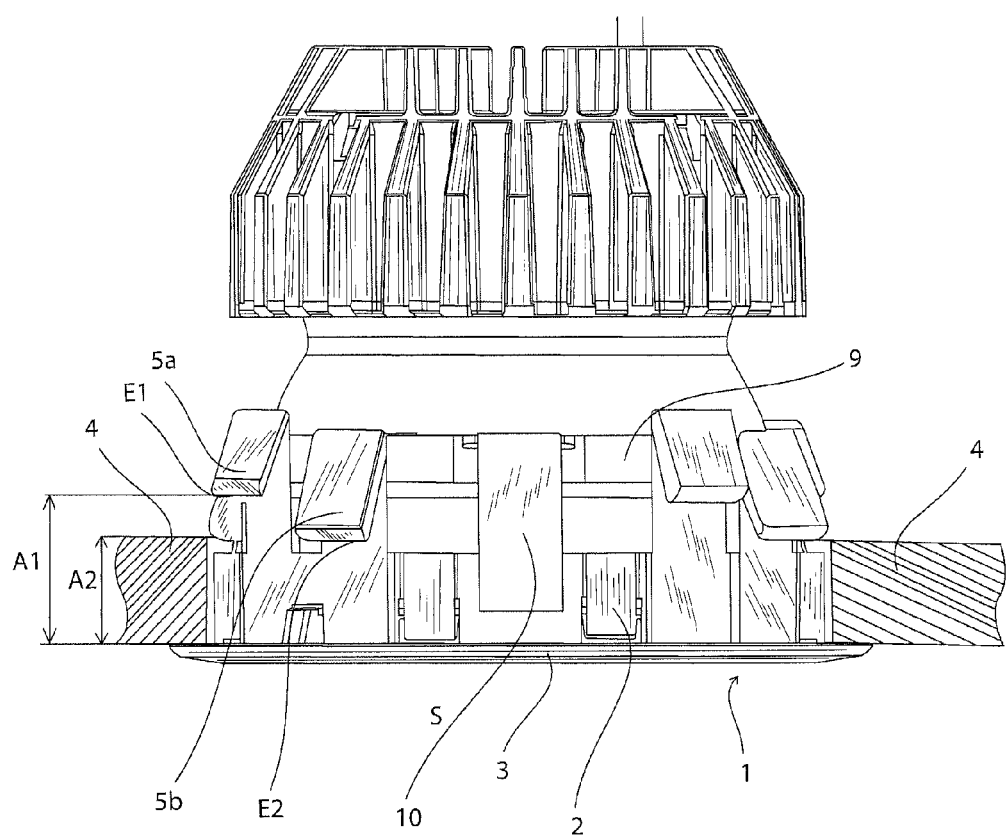
FIG. 3 is an enlarged view according to FIG. 1.

In the figures, a reading lamp for installation in a cabin trim element has an installation frame 1 having a ring element 2, whence a flange 3 extends on a visible side S so as to bear against an edge section of a cabin trim element 4. The edge section of the cabin trim element 4 surrounds a hole, via which the reading lamp can be inserted into the cabin trim element 4 until the flange 3 bears against the edge section surrounding the hole. The reference sign 5a denotes first latching springs and the reference sign 5b denotes second latching springs which extend from the ring element 2 away from the flange 3. As shown in particular in FIG. 3, a first end E1 of the first latching springs 5a has a first separation A1 with respect to the flange 3. A second end E2 of the second latching springs 5b has a second separation A2 with respect to the flange 3. In the present exemplary embodiment, the cabin trim element 4 has a thickness which approximately corresponds to the second separation A2. Consequently, in the exemplary embodiment shown, the installation frame 1 is held in the cabin trim element 4 by means of the second latching springs 5b. The second latching springs 5b force the flange 3 against an edge section, on the visible side, of the cabin trim element 4.

Figure 4:
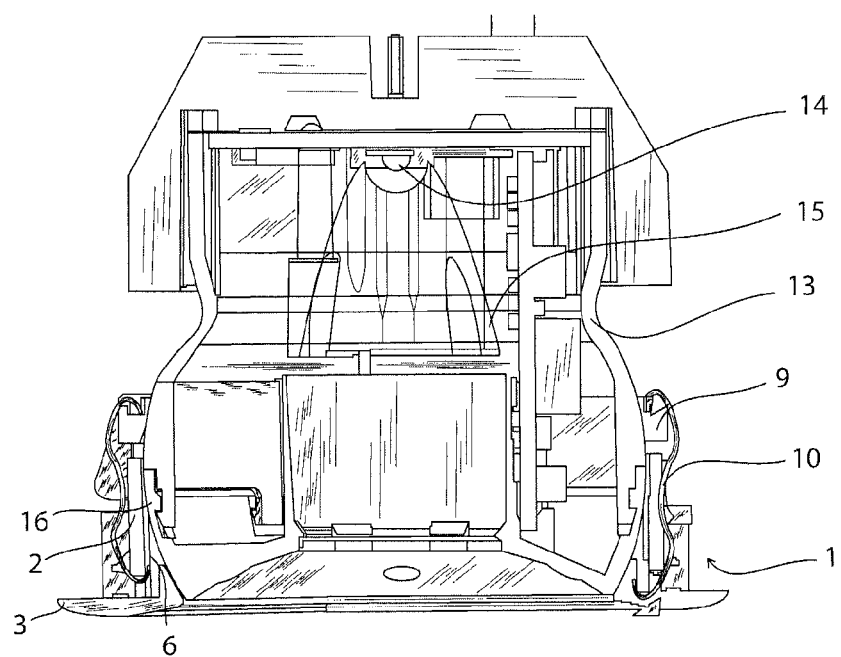
FIG. 4 is a view in section through the reading lamp according to FIG. 3.
Figure 5:
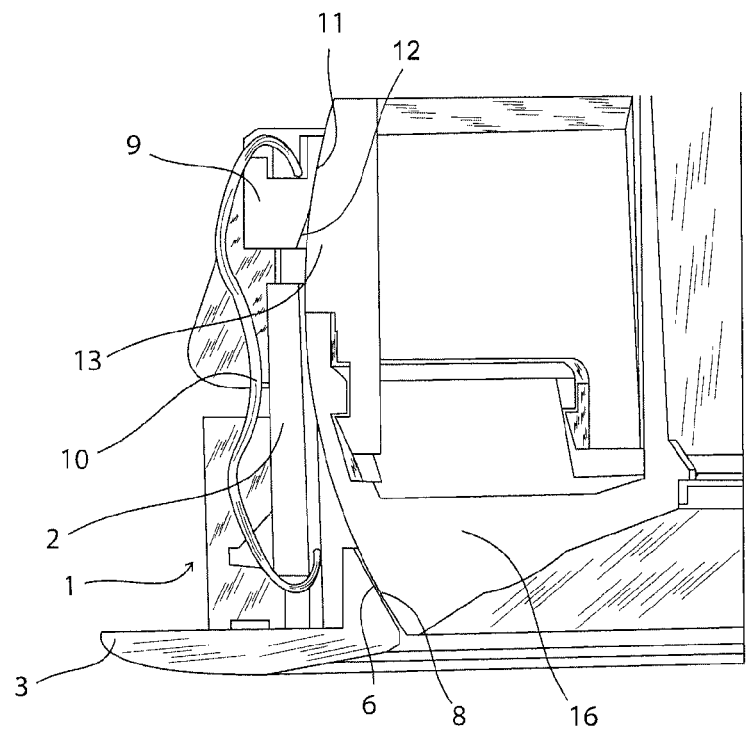
FIG. 5 is a detail view according to FIG. 4.

The ring element 2 has, on its inner surface, an annular support surface 6 which is configured so as to correspond to a mating support surface 8 provided on a partially ball-shaped lamp housing 7. The lamp housing 7 has a maximum diameter D in the ball-shaped section. The reference sign 9 denotes a clamping ring whose diameter is smaller than the maximum diameter D. The clamping ring 9 is connected to the installation frame 1 by means of retaining clips 10. The retaining clips 10 are made of spring steel and force the clamping ring 9 towards the installation frame 1 in the manner of a tension spring. The lamp housing 7 has, in the ball-shaped section, a first sliding surface 11 against which a second sliding surface 12 of the clamping ring 9 bears. As shown in particular in FIG. 4, the largest diameter D is between the clamping ring 9 and the support surface 6, the inner diameters of which are in each case smaller than the maximum diameter D.

The lamp housing 7 has a first housing shell 13, in which a light-emitting means 14 and a reflector 15 are mounted. The reference sign 16 denotes a second housing shell which has the mating support surface 8. The second housing shell 16 is latched together with the first housing shell 13 having the first sliding surface 11.

The function of the reading lamp is as follows:

By virtue of the effect of the retaining clips 10, the clamping ring 9 is forced against the first sliding surface 11 of the lamp housing 7. Thus, the mating support surface 8 of the lamp housing is simultaneously forced against the correspondingly configured support surface 6 on the installation frame 1. A tension spring force of the retaining clips 10 is set such that the lamp housing 7 is held in its position on the installation frame 1 in a friction-locking manner.

In order to adjust the position of the lamp housing 7 relative to the installation frame 1, it is possible to manually exert a pressure on the lamp housing 7, which pressure is counter to the tensile force provided by the retaining clips 10. As a consequence thereof, the mating support surface 8 lifts off from the support surface 6 of the support frame 1. The lamp housing 7 may be adjusted in its position relative to the installation frame 1 in the manner of a ball and socket joint. Once the force applied for the purpose of adjusting the lamp housing 1 is no longer in effect, the mating support surface 8 of the housing is once again forced against the support surface 6 by the tensile force of the retaining clips 10, and the housing is held in the set position in a friction-locking manner.

By virtue of providing differently configured first 5a and second latching springs 5b, it is possible to mount the reading lamp in cabin trim elements 4 having a different thickness. In the present exemplary embodiment, the reading lamp is latched in a cabin trim element 4 whose thickness corresponds to the second separation A2 of the second end E2 of the second latching springs 5b from the flange 3. The proposed reading lamp may equally be mounted in cabin trim elements (not shown here) whose thickness corresponds to the first separation A1, which is formed between the first end E1 of the first latching springs 5a and the flange 3.

LIST OF REFERENCE SIGNS

1 Installation frame
2 Ring element
3 Flange
4 Cabin trim element
5a First latching spring
5b Second latching spring
6 Support surface
7 Lamp housing
8 Mating support surface
9 Clamping ring
10 Retaining clip
11 First sliding surface
12 Second sliding surface
13 First housing shell
14 Light-emitting element
15 Reflector
16 Second housing shell
A1 First separation
A2 Second separation
E1 First end
E2 Second end
S Visible side

The invention claimed is:

1. A reading lamp for installation in a cabin trim element of a vehicle, comprising:
    an installation frame having a ring element,
        wherein a flange extends on a visible side of the installation frame to bear against an edge section surrounding a hole in the cabin trim element,
        wherein securing elements are provided on the ring element to secure the installation frame on the cabin trim element, and
        wherein an inner surface of the ring element has a support surface against which a lamp housing bears in a form-fitting manner, the lamp housing being configured at least partially in the shape of a ball;

the lamp housing comprising a mating support surface and a first sliding surface, wherein the mating support surface is configured to bear against the support surface and be moveable with respect to the support surface; and a clamping ring comprising a second sliding surface, wherein the second, sliding surface is configured to bear against the first sliding surface and be moveable with respect to the first sliding surface, wherein the clamping ring is connected to the installation frame through tension spring elements, such that the lamp housing is forced against the support surface through the clamping ring and is movable with respect to the installation frame in the manner of a ball and socket joint.

2. The reading lamp according to claim 1, wherein the vehicle is an aircraft.

3. The reading lamp according to claim 1, wherein the clamping ring is made of PTFE.

4. The reading lamp according to claim 1, wherein the tension spring elements comprise retaining clips made from a spring steel.

5. The reading lamp according to claim 1, wherein the securing elements comprise first latching springs, wherein a first end of the first latching springs has a first separation with respect to the flange.

6. The reading lamp according to claim 5, wherein the securing elements comprise second latching springs, wherein a second end of the second latching springs has a second separation with respect to the flange, and wherein the second separation is smaller than the first separation.

7. The reading lamp according to claim 6, wherein the first and the second latching springs are respectively attached adjacent to one another on the installation frame.

8. The reading lamp according to claim 1, wherein the lamp housing is formed of a first housing shell, which comprises the first sliding surface, and a second housing shell, which comprises the mating support surface.

9. The reading lamp according to claim 8, wherein the first and the second housing shell are latched to one another.

\* \* \* \* \*